(12) United States Patent
Berland et al.

(10) Patent No.: US 8,976,440 B2
(45) Date of Patent: Mar. 10, 2015

(54) AUTONOMOUS ELECTROCHROMIC ASSEMBLY

(71) Applicant: ITN Energy Systems, Inc., Littleton, CO (US)

(72) Inventors: Brian Spencer Berland, Morrison, CO (US); Bruce Roy Lanning, Littleton, CO (US); Michael Wayne Stowell, Jr., Loveland, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 49 days.

(21) Appl. No.: 13/758,387

(22) Filed: Feb. 4, 2013

(65) Prior Publication Data
US 2013/0201546 A1 Aug. 8, 2013

Related U.S. Application Data

(60) Provisional application No. 61/594,643, filed on Feb. 3, 2012.

(51) Int. Cl.
*G02F 1/153* (2006.01)
*G02F 1/15* (2006.01)
(Continued)

(52) U.S. Cl.
CPC .............. *G02F 1/163* (2013.01); *G02F 1/1533* (2013.01); *G02F 2001/13324* (2013.01)
USPC .......................... 359/275; 359/265; 244/129.3

(58) Field of Classification Search
CPC ....... G02F 1/15; G02F 1/1525; G02F 1/1533; G02F 1/163; G02F 2001/153; B60J 1/00; B60J 3/04; B64C 1/14; B64C 1/1484; B64C 1/1492; B64D 2011/0061; B32B 17/06; B32B 17/10036; B32B 17/10174; B32B 17/10697

USPC .............. 359/265–275, 601, 604; 244/129.3; 296/96.16; 362/540; 700/276, 278

See application file for complete search history.

(56) References Cited

U.S. PATENT DOCUMENTS

| | | | |
|---|---|---|---|
| 6,392,387 B1 | 5/2002 | Sage et al. | |
| 6,515,787 B1 | 2/2003 | Westfall et al. | |

(Continued)

FOREIGN PATENT DOCUMENTS

EP 2517332 A2 10/2012

OTHER PUBLICATIONS

Wikipedia, "Smart Glass", obtained online on Apr. 30, 2013 at: http://en.wikipedia.org/wiki/Smart_glass, 8 pages.

(Continued)

*Primary Examiner* — Loha Ben
(74) *Attorney, Agent, or Firm* — George C. Lewis; Merchant & Gould P.C.

(57) ABSTRACT

This disclosure describes system and methods for creating an autonomous electrochromic assembly, and systems and methods for use of the autonomous electrochromic assembly in combination with a window. Embodiments described herein include an electrochromic assembly that has an electrochromic device, an energy storage device, an energy collection device, and an electrochromic controller device. These devices may be combined into a unitary electrochromic insert assembly. The electrochromic assembly may have the capability of generating power sufficient to operate and control an electrochromic device. This control may occur through the application of a voltage to an electrochromic device to change its opacity state. The electrochromic assembly may be used in combination with a window.

19 Claims, 5 Drawing Sheets

(51) Int. Cl.
  *B64C 1/14* (2006.01)
  *G02F 1/163* (2006.01)
  *G02F 1/133* (2006.01)

(56) References Cited

U.S. PATENT DOCUMENTS

| | | | |
|---|---|---|---|
| 6,822,778 | B2 | 11/2004 | Westfall et al. |
| 6,856,444 | B2 | 2/2005 | Ingalls et al. |
| 7,009,750 | B1 | 3/2006 | Westfall et al. |
| 7,126,091 | B1 | 10/2006 | Westfall et al. |
| 7,133,181 | B2 | 11/2006 | Greer |
| 7,145,709 | B1 | 12/2006 | Westfall et al. |
| 7,215,457 | B1 | 5/2007 | Westfall et al. |
| 7,265,890 | B1 | 9/2007 | Demiryont |
| 7,265,891 | B1 | 9/2007 | Demiryont |
| 7,277,215 | B2 | 10/2007 | Greer |
| 7,372,610 | B2 | 5/2008 | Burdis et al. |
| 7,531,239 | B2 | 5/2009 | Demiryont |
| 7,586,667 | B2 | 9/2009 | Demiryont |
| 7,593,154 | B2 | 9/2009 | Burdis et al. |
| 7,619,804 | B1 | 11/2009 | Demiryont |
| 7,704,555 | B2 | 4/2010 | Demiryont |
| 7,830,585 | B2 | 11/2010 | Widjaja et al. |
| 8,292,228 | B2 * | 10/2012 | Mitchell et al. ............ 244/129.3 |
| 8,632,034 | B2 * | 1/2014 | Mitchell et al. ............ 244/129.3 |
| 2011/0148218 | A1 | 6/2011 | Rozbicki |

OTHER PUBLICATIONS

Electric Power Research Institute, Development of Flexible Electrochromic Films, 1018525, Technical Update, Dec. 2009, EPRI Project Manager: K.R. Amarnath, 2009, 42 pgs.

* cited by examiner

AUTONOMOUS ELECTROCHROMIC ASSEMBLY

RELATED APPLICATION

This application claims the benefit of U.S. Provisional Application No. 61/594,643, filed Feb. 3, 2012, which application is hereby incorporated by reference.

GOVERNMENT LICENSE RIGHTS

This invention was made with government support under grant number DE-AR0000019 awarded by the Advanced Research Projects Agency, Department of Energy. The government has certain rights in the invention.

INTRODUCTION

Electrochromic devices may be used in a variety of applications where it is desirous to control the opacity of an object. For example, an electrochromic device may be used in conjunction with a window to create a "smart window." Some smart windows may be constructed by first depositing the electrochromic device on a flexible substrate. Additionally, the electrochromic device may then be oriented such that light traveling through the window pane passes through the electrochromic device. A voltage may then be applied to the electrochromic device to change the opacity of the electrochromic device. Controlling this voltage results in controlling the amount of light that passes through the window.

Smart windows may be used for privacy purposes or for energy efficiency purposes. Energy efficiency may be realized by controlling the amount of light entering a confined space. For example, when it is desirous to heat a space, such as an office building, the smart window may be controlled to allow more light to pass through the window. This light may heat the interior space and reduce the amount of additional energy required to heat the space to a desired temperature. Alternatively, the smart window may be used to allow less light to pass through a window thus keeping the space cool.

It is with respect to these and other considerations that embodiments have been made. Also, although relatively specific problems have been discussed, it should be understood that the embodiments should not be limited to solving the specific problems identified herein.

Autonomous Electrochromic Assembly

This disclosure describes system and methods for creating an autonomous electrochromic assembly, and it describes systems and methods for use of the autonomous electrochromic assembly in combination with a window. Embodiments described herein include an electrochromic assembly that has an electrochromic device, an energy storage device, an energy collection device, and an electrochromic controller device. These devices may be combined into a unitary electrochromic insert assembly. The electrochromic assembly may have the capability of generating power sufficient to operate and control an electrochromic device. This control may occur through the application of a voltage to an electrochromic device to change its opacity state. The electrochromic assembly may be used in combination with a window. The window may be a single or a double paned window. Also, although relatively specific problems have been discussed, it should be understood that the embodiments should not be limited to solving the specific problems identified herein.

One aspect of the present disclosure is an autonomous electrochromic window. The window may include a first window pane, a second window pane spaced apart from the first window pane, a frame holding the first and second window panes, a unitary electrochromic insert assembly. The unitary electrochromic insert assembly may include an electrochromic device, an energy collection device, an energy storage device, a controller controlling operation of the electrochromic device.

Another aspect of the present disclosure is an autonomous unitary electrochromic assembly. The assembly may include a transparent substrate, an electrochromic device having at least a first opacity state and a second opacity state, an energy collection device, an energy storage device; and a controller adapted to use energy generated by the energy collection device and stored in the energy storage device to change the electrochromic device from the first opacity state to the second opacity state.

Further, another invention of the devices is an autonomous unitary power assembly for use with an electrochromic window comprising, a controller controlling delivery of energy. The energy maybe delivered to a device electrically coupled to the controller, an energy collection device, and an energy storage device.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

BRIEF DESCRIPTION OF THE DRAWINGS

Non-limiting and non-exclusive embodiments are described with reference to the following figures.

DETAILED DESCRIPTION

It should be noted that this application uses the terms "transparent," "translucent," "opaque," and "opacity." As used in this application, the word transparent describes the property of allowing substantially all light, or a large portion thereof, of a given electromagnetic range (e.g., the visible range or a portion thereof) to pass through the material. As such, it is possible that a material may be "transparent" with respect to a certain portion of the electromagnetic spectrum, but be opaque or translucent with respect to other portions of the electromagnetic spectrum. Additionally, a device may be considered transparent even if some small amount of light within the given electromagnetic range is scattered or reflected. As used, "transparent" is best understood as a relative term to distinguish a state of an electrochromic device from an "opaque" state in which less light passes through the device. Translucent describes the property of scattering light as the light passes through an object.

Translucent and transparent are not exclusive terms; that is, it is possible for a material to be both highly translucent and highly transparent or, alternatively, highly translucent but not very transparent. Opacity describes the degree to which a material prevents light or a portion of the electromagnetic spectrum from passing through the material, such degree ranging from highly transparent to perfectly opaque. A material may have multiple opacity states and may change between these opacity states. Unless explicitly stated, these terms refer at least to the visible spectrum, although one of skill in the art will understand that the affected spectrum may be expanded or changed depending on the end goal (e.g., if the goal is to manage temperature in the interior space, then increasing the opacity of non-visible portions of the electromagnetic spectrum may be beneficial).

As discussed above, in an embodiment, an autonomous electrochromic assembly may include an electrochromic device, an energy collection device, an energy storage unit, and an electrochromic device controller. This autonomous electrochromic assembly may be used in conjunction with a window to control the amount of light passing through the window. Because the autonomous electrochromic assembly is autonomous in the sense that it receives its power from ambient light (i.e., it may be considered self-powered or passively powered), it may be easily retrofitted into existing construction without the need to provide wired or active wireless power to the window. Thus, by simply replacing traditional windows or exterior (or interior) panels with the windows described herein, a structure may be upgraded to allow active control of the light energy passing into the structure.

An energy collection device may be a photovoltaic device (including a transparent photovoltaic), a wireless power beam devices (such as radio frequency, e.g., ZIGBEE or IR), a magnetic induction device, or a thermoelectric device.

Figure 1:
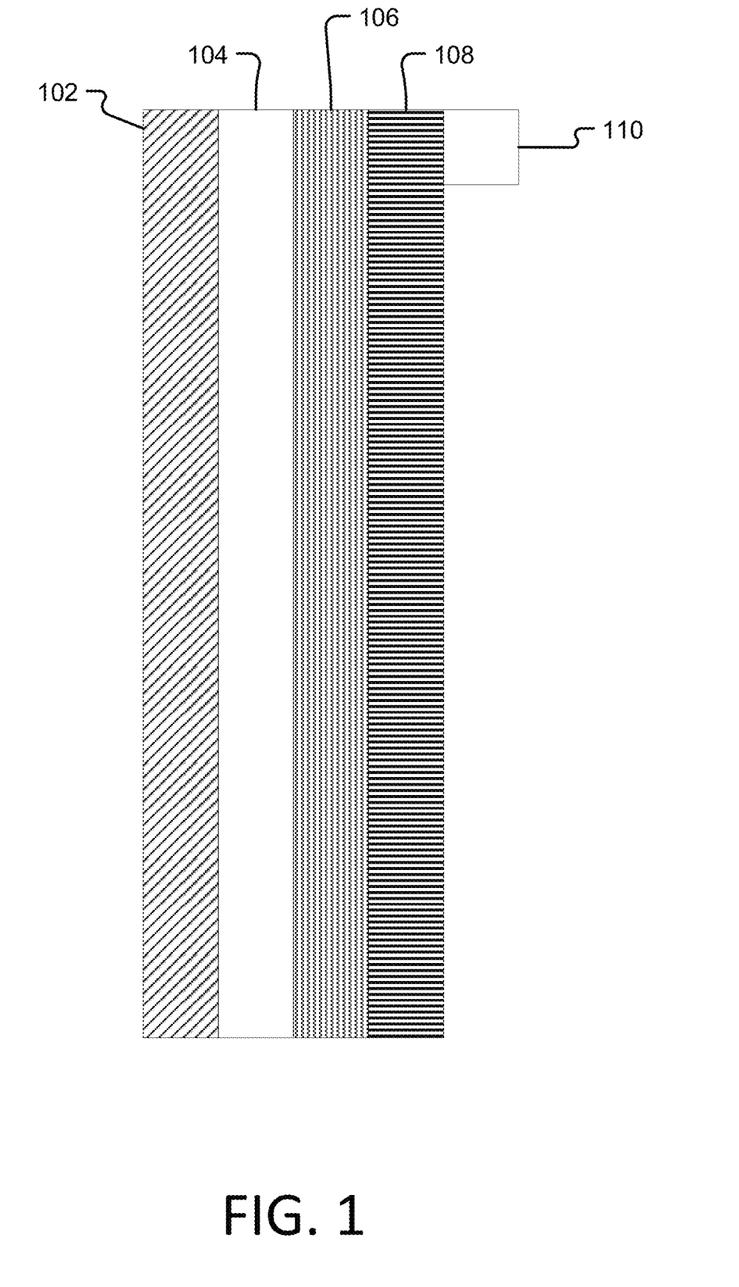
FIG. 1 illustrates an embodiment of an electrochromic autonomous assembly.

For example, FIG. 1 illustrates an embodiment of an autonomous electrochromic assembly 100. In embodiments, an autonomous electrochromic assembly 100 includes an electrochromic device 102, a superstrate 104, an energy collection device 106, an energy storage device 108, and an electrochromic device controller 110.

In embodiments presented herein, the electrochromic device 102 is described as a thin film electrochromic device, although other types of electrochromic devices may be used. A thin film electrochromic device 102 may have multiple layers including a substrate layer, a counter electrode layer, an electrolyte layer, and an electrochromic layer. The substrate layer may be flexible or rigid. The substrate layer may be indium tin oxide ("ITO") coated polyethylene terephthalate ("PET"). Alternatively, the substrate layer may be glass, or another substantially transparent or translucent material. Additionally, the counter electrode layer may be a lithiated metal oxide or a lithiated mixed metal oxide. For example, lithium vanadium oxide, lithium nickel oxide, and lithium nickel tungsten oxide (where the ratio of W to Ni is less than 1 to 1) may be used. The electrochromic layer may be a similarly mixed oxide, such as molybdenum tungsten oxide (where the Mo to W ratio is less than 1 to 1). These layers may be formed using a variety of processes such as physical vapor deposition, chemical vapor deposition, thermal evaporation, pulsed laser deposition, sputter deposition, and sol-gel processes. A roll-to-roll manufacturing process may be used for flexible electrochromic film. This process may achieve cost reduction with high-yield manufacturing.

A voltage may be applied to an electrochromic device 102 to cause the electrochromic device 102 to change its opacity state. For example, an electrochromic device 102 may change from substantially transparent with respect to the visible light range to an opacity state that reflects or otherwise prevents blue light from passing through the device. Other opacity changes are possible and may be selected by the manufacturer to achieve desired performance criteria. An electrochromic device 102 may become more or less reflective or opaque when voltage is applied.

Additionally, an electrochromic device 102 may be temperature controlled. A cooling device may be used to remove excess heat from an electrochromic device 102. Cooling an electrochromic device 102 may reduce heat transfer into a confined space, such as an interior of a building. Alternatively, heating an electrochromic device 102 may allow for a faster conversion of an electrochromic device 102 from one opacity state to another opacity state. The device used to control temperature may be a thermoelectric device. A thermoelectric device may provide either an active heating or cooling solution by reversing the polarity of the applied voltage. Depending on the embodiment, the power supplied to the thermoelectric device may be supplied by either or both of an energy collection device 106 or an energy storage device 108.

In rigid embodiments, a superstrate 104 may be a rigid plastic such as acrylic or PLEXIGLASS. A superstrate 104 may be affixed to an electrochromic device 102 by lamination or by any other suitable method. By adhering the material directly to a rigid superstrate immediately after the manufacturing of an electrochromic device 102, wrinkling and creasing of an electrochromic device 102 may be mitigated. Alternatively an electrochromic device 102 may be mechanically attached to a superstrate 104. Additionally, direct deposition of an electrochromic device 102 onto a superstrate 104 may occur. This may also prevent wrinkling of an electrochromic device 102. A superstrate 104 may be substantially transparent with respect to the visible light range or translucent with respect to the visible light range.

A superstrate 104 may have additional integrated functionality. For example, resistive heaters may be used to heat the superstrate. This may be accomplished by running current through a slightly conductive superstrate. Electrical connections may be fed to a controller to control the power to a superstrate 104. This controller may be integrated within a device controller 110. Alternatively, the controller may be a separate controller. Heating a superstrate 104 may cause an electrochromic device 102 to be heated. This may reduce the time it takes an electrochromic device 102 to switch from one opacity state to another opacity state. This may occur because ion conductivities are poor at low temperatures, and heating the superstrate may heat an electrochromic device 102.

An energy collection device 106 may be used in the autonomous electrochromic assembly 100. An energy collection device 106 may be used to capture energy to control an electrochromic device 102.

An energy generating device 106 may be a thin film photovoltaic device or, alternatively, may be of any other suitable construction. In embodiments, an energy collection device 106 may be a thin film photovoltaic and have a surface area such that the device need only collect a small portion of the light that passes through the surface of an energy collection device 106. This may result in an energy collection device 106 being substantially transparent with respect to the visible light range. In an embodiment, the energy collection device 106 is substantially or entirely co-extensive with the electrochromic device 102 such that all or nearly all light passing through the assembly 100 passes through both the energy collection device 106 and the electrochromic device 102.

In alternative embodiments, an energy collection device 106 may be a device that is not substantially transparent. An energy collection device 106 may be opaque. An opaque energy collection device 106 may be integrated into the edge of the assembly 100, such as in the location of the window frame, or inside the window spacer. An opaque energy collection device 106 may be oriented with respect to the window pane area such that it does not significantly reduce the line of sight. Thus, in this embodiment, the energy collection device 106 is not co-extensive with the electrochromic device 102.

An energy collection device 106 may be laminated or otherwise adhered to the superstrate. Alternatively, an energy collection device 106 may be deposited using similar or the same methods described with reference to depositing an electrochromic device 102. Deposition of an energy collection device 106 may occur concurrently with an electrochromic device 102 as part of a continuous manufacturing process.

An energy storage device 108 may be used in the autonomous electrochromic assembly 100. In embodiments' very thin metals and dielectrics may be used to create a thin film capacitor to store energy generated from an energy collection device 106. In embodiments, the capacitor may be a part of an infrared filter that rejects some infrared light or, alternatively, some other portion of the electromagnetic spectrum. This may reduce the need for other layers or coatings that perform similar infrared filter functions. In an embodiment, the energy storage device 108 may be substantially transparent with respect to the visible light range and may be substantially or entirely co-extensive with the electrochromic device 102 such that all or nearly all light passing through the assembly 100 passes through both the energy storage device 108 and the electrochromic device 102. In yet another embodiment, both the energy storage device 108 and the energy collection device 106 may be substantially transparent with respect to the visible light range and both may be substantially or entirely co-extensive with the electrochromic device 102 such that all or nearly all light passing through the assembly 100 passes through all three components of the assembly. Additionally, a capacitor or battery may be located at the edge of the window pane area outside of the sightline.

Alternatively, in an embodiment of the assembly 100 a battery could be employed as the energy storage device 108 to store the energy. Such a battery could be a thin film lithium ion battery or similar construction. In an embodiment the battery could be solid state or have a liquid or semiliquid electrolyte. Because the assembly may be confined in a controlled and protected environment within a window or panel structure, some battery designs which would not be suitable for use under exposed conditions may be suitable in applications described herein. For example, the gas environment within the window volume (e.g., the selection of gas between the panes of the window) may be selected to allow the use of specific device designs that would not be suitable for use in an ambient environment.

An electrochromic device 102 may be controlled by an electrochromic device controller 110. In an embodiment, an electrochromic controller 110 may be a microchip controller. An electrochromic device controller 110 may be hidden from view. An electrochromic device controller 110 may communicate wirelessly to a central control system or user interface using various communication protocols such as but not limited to BLUETOOTH, ZIGBEE, IR, and RF telemetry. Additionally, an electrochromic device controller 110 may be integrated in the frame of the window. Power to the electrochromic device controller 110 may be supplied directly by an energy collection device 106, or it may be supplied by an energy storage device 110 which in turn may be supplied by the energy collection device 106.

Although an autonomous electrochromic assembly 100 is illustrated as a series of layered thin film devices (which may be referred to as a unitary electrochromic insert assembly) with an attached electrochromic device controller 110, it need not be. In other embodiments, some devices may be physically separated from the other devices of the assembly. For example, an electrochromic device 102 may be attached to a flexible superstrate 104. An electrochromic device 102 and a flexible superstrate 104 may be then be attached to a transparent or translucent area of an object such as a window pane. An energy collection device 104 may be affixed to a different area that is exposed to a light source such as the outside of a window frame. The electrochromic device 102 may then be electrically coupled to an energy collection device 104. An energy storage device 108 may be electrically coupled to an energy collection device 104 and an electrochromic device 102. An electrochromic device controller 110 may then be electrically coupled to an electrochromic device 102. The configuration may be such that the electrochromic device controller 110 controls the voltage and current delivered to the electrochromic device 102.

Additionally, although FIG. 1 illustrates the use of only one of the following devices: an electrochromic device 102, a superstrate 104, an energy collection device 106, a transparent storage device 108, and an electrochromic device controller 110, an electrochromic assembly 100 may include multiple such devices.

Figure 2A:
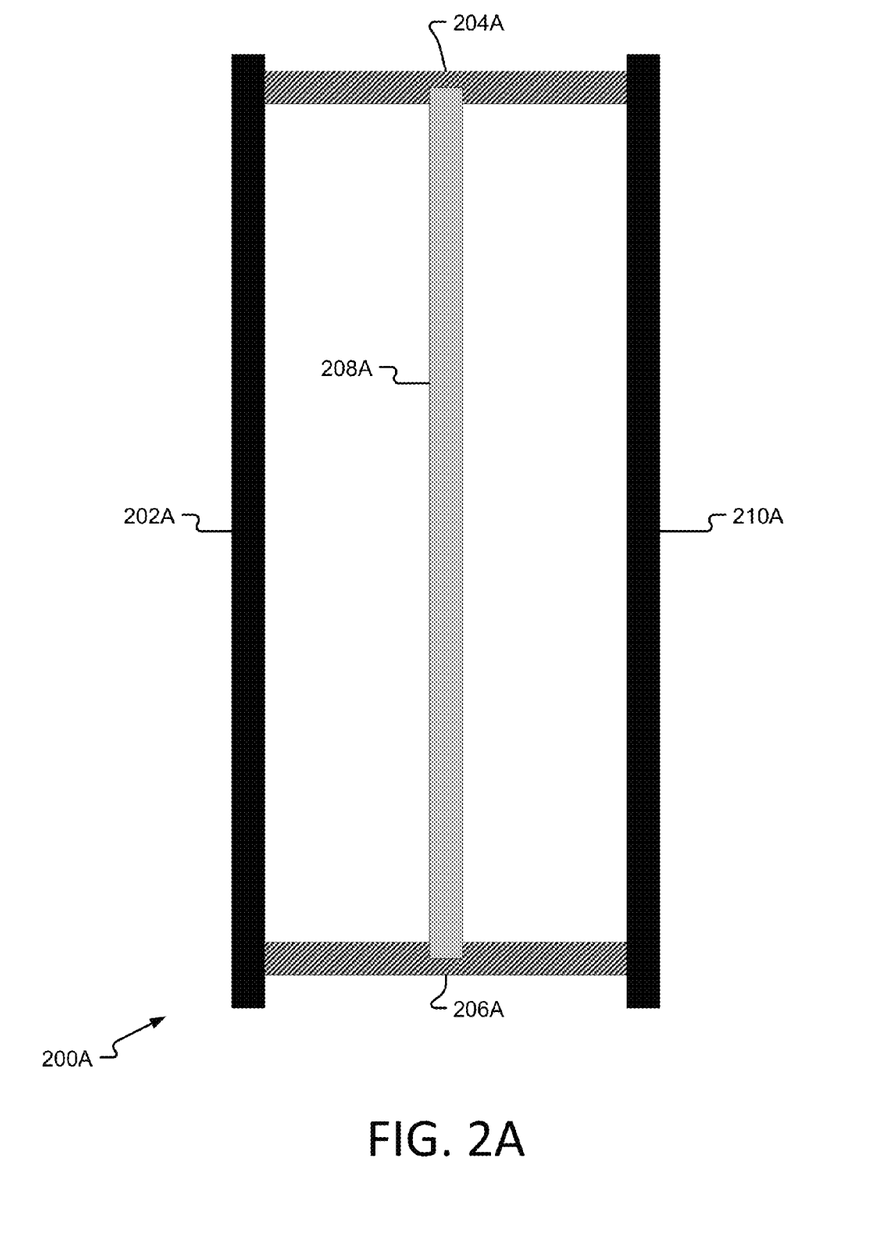
FIG. 2A illustrates an embodiment of an electrochromic window architecture.

With reference to FIG. 2A, FIG. 2A illustrates an embodiment of an electrochromic window architecture 200A. In embodiments, an electrochromic window architecture 200A has a first window pane 202A, a top-structural spacer 204A, a bottom-structural spacer 206A, an autonomous electrochromic assembly 208A, and a second window pane 210A.

A first window pane 202A and a second window pane 210A may be made of a variety of material. This includes transparent materials such as glass and plastic. The window pane may be rigid or it may not. Additionally, the window pane may be colored. The window pane may also be translucent.

A top-structural spacer 204A and a bottom structural spacer 206A may be made of a variety of materials. This includes aluminum, vinyl, composite, fiberglass, or wood. A top-structural spacer 204A and a bottom structural spacer 206A may be used to space apart a first window pane 202A and a second window pane 210A. In embodiments the two spacers may add structural stability to a window. Any suitable materials and designs may be used for the window construction.

In embodiments, an electrochromic device assembly 208A may include an energy storage device, an energy collection device, an electrochromic device, and an electrochromic device controller. These devices may have similar properties as those discussed with reference to FIG. 1. An autonomous electrochromic assembly 208A may be a rigid unitary electrochromic insert assembly. For example, the device may have a superstrate layer of rigid plastic or glass. Alternatively, an autonomous electrochromic assembly 208A may be a flexible unitary electrochromic insert assembly.

Certain devices of an autonomous electrochromic assembly 208A may penetrate into a top-structural spacer 204A and a bottom-structural spacer 206A. These devices may include an energy collection device, an energy storage device, a superstrate, and an electrochromic device. For example, a unitary electrochromic insert assembly may be used, and the unitary electrochromic insert assembly may penetrate into a top-structural spacer 204A and a bottom-structural space 206A. This may substantially maintain the penetrating devices, such as a unitary electrochromic insert assembly, in a fixed position relative to a first window pane 202A and a second window pane 210A.

Figure 2B:
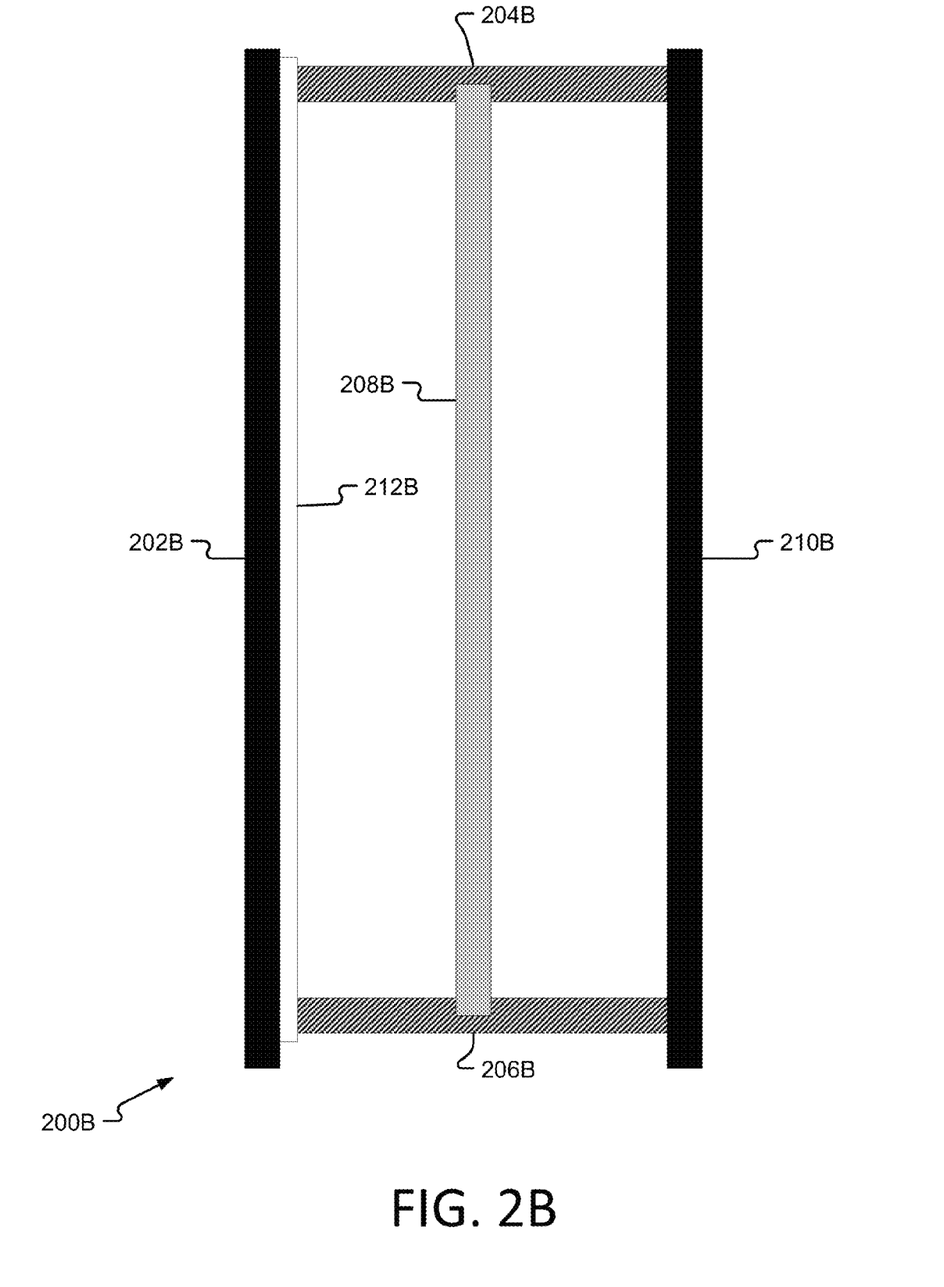
FIG. 2B illustrates an alternative embodiment of an electrochromic window architecture.

With reference to FIG. 2B, FIG. 2B illustrates an alternative embodiment of an electrochromic window architecture 200B. The architecture 200B shown is similar to that shown in FIG. 2A with the exception that an electrochromic device 212B is provided on or near one of the window panes 202B and 210B. The electrochromic device 212B may be a second electrochromic device in addition to one from the assembly 208B. In an alternative embodiment, the assembly 208B may not include an electrochromic device. The result may be such that the electrochromic device 212B is the only electrochromic device in the architecture 200B. In yet another embodiment (not shown), three electrochromic devices may be used, one on each window pane 202B, 210B and a third in the assembly 208B. Depending on the construction, an electrochromic device 212B on a window pane need not extend beyond a structural spacer 204B or 206B as shown.

With reference to both FIG. 2A and FIG. 2B, devices of an autonomous electrochromic assembly may be located in alternative locations of an electrochromic window architecture. For example, an energy collection device may be an opaque device located in or attached to a window frame. In other embodiments, an energy storage device may be a lithium battery. Additionally, a lithium battery may be housed in the frame of the window and may be rechargeable by the energy collection device or, alternatively, may be a traditional disposable alkaline battery that can be replaced when spent. A device controller may be located near an electrochromic device.

In other embodiments, an electrochromic window architecture only has one window pane. In an embodiment, a unitary electrochromic insert assembly may be attached to the window pane. In another embodiment, the electrochromic device may be deposited onto the one window pane. The energy generating may be a transparent energy generating affixed to the window pane, or it may be a substantially opaque energy generating that is imbedded into the frame, affixed to the surface of the frame, or positioned along the border of the window pane. A controller may be located at the edge of the electrochromic window architecture. An energy storage device may be imbedded into the frame, affixed to the surface of the frame, or positioned in an area of the window pane. The energy storage device may be transparent or it may not be transparent. Transparent components may be located within the viewing area of the window when installed.

Figure 3A:
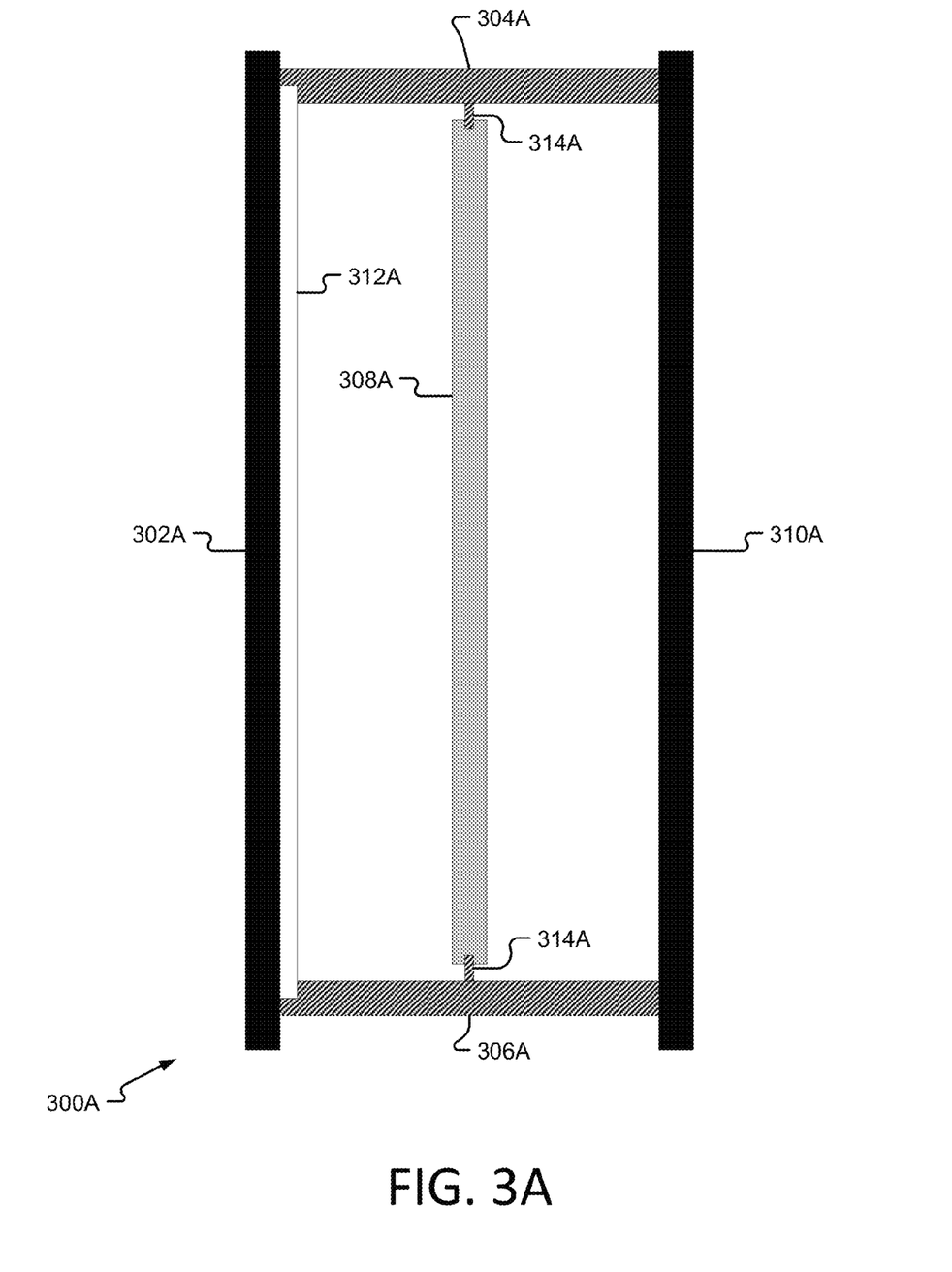
FIG. 3A illustrates an embodiment of an insulating electrochromic window architecture.

With reference to FIG. 3A, FIG. 3A illustrates an embodiment of an insulating electrochromic window architecture 300A. In embodiments, the insulating electrochromic window architecture 300A has a first window pane 302A, an energy collection device 312A, a top-structural spacer 304A, a bottom structural-spacer 306A, an insert 308A, a second window pane 310A, and an insert-holding tab 314A.

In embodiments, the window panes 302A and 310A, and the structural spacers 304A, 306A may be similar to those described with reference to FIGS. 2A and 2B.

In embodiments, an insert 308A may be rigid in nature or it may not. In embodiments, an insert 308A may include an energy collection device, an energy storage device, and an electrochromic device controller. Alternatively, an insert 308A may include only an energy collection device or only a superstrate. The energy storage device and electrochromic device controller may be located at a different location, such as in the frame of a window.

In embodiments, a electrochromic device 312A, may be deposited on a first window pane 302A. This deposition may occur using any of the variety of deposition techniques discussed with reference to FIG. 1 above.

In embodiments, an insert-holding tab 314A may mechanically attach to an insert 312A. Alternatively, any other suitable means of attachment may be used. This insert may allow for improved U-factors for windows without the manufacturing challenges associated with penetrating the primary seal, such as a spacer. This may allow for reduced manufacturing costs. An insert-holding tab 314A may help position an insert 312A optimally between a first window pane 302A, a second window pane 310A, and a spacers 304A and 306A.

It should be noted that the term U-Factor indicates a rate of heat loss of a window assembly. The lower the U-factor, the greater a window's resistance to heat flow and the better its insulating properties.

Figure 3B:
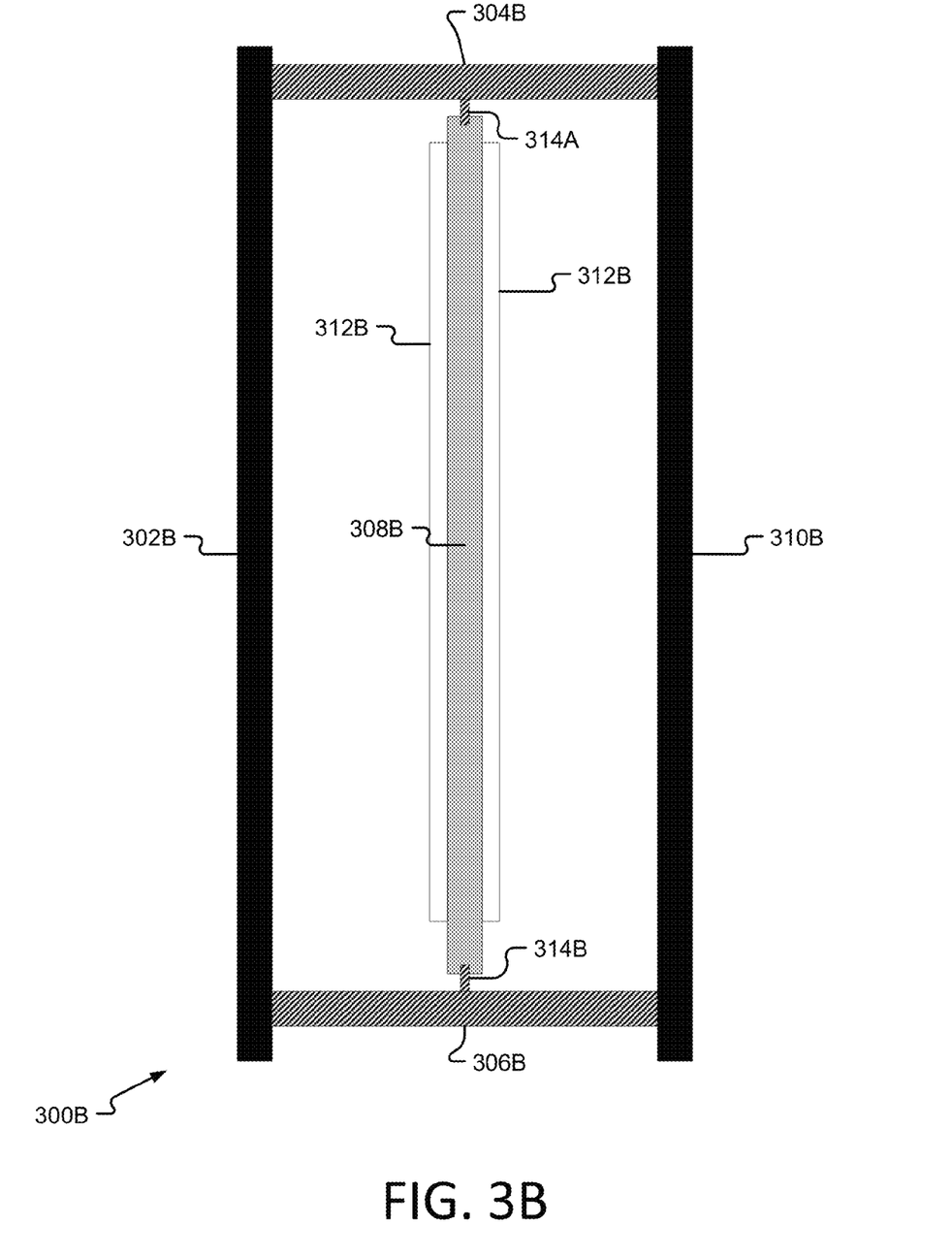
FIG. 3B illustrates an alternative embodiment of an insulating electrochromic window architecture.

With reference to FIG. 3B, FIG. 3B illustrates an alternative embodiment of an insulating electrochromic window architecture 300B. In embodiments, the window architecture 300B has a first window pane 302B, dual electrochromic films 312B, a top-structural spacer 304B, a bottom structural-spacer 306B, an insert 308B, a second window pane 310B, and an assembly-holding tab 314B.

In embodiments, the window panes 302B and 310B, and the structural spacers 304B and 306B may be similar to those described with reference to FIGS. 2A and 2B.

In embodiments, an insert 308B may be rigid in nature or it may not. In embodiments, an insert 308B may include an energy collection device, an energy storage device, and an electrochromic device controller. An energy storage device and electrochromic device controller may be located at a different location, such as in the frame of the window.

In embodiments, one or more electrochromic devices 312B may be deposited on an insert 308B. In an embodiment, a single electrochromic film may be wrapped to attach to both sides of an insert 314B. In embodiments, an electrochromic film is attached to two sides of an insert to enable multiple tone coloration. For example, controlling one side of the electrochromic film independently of the other side of the electrochromic film may result in four possible light transparency schemes for an insulating electrochromic window architecture 300B. This may also enhance the overall coloration range without changing production specifications such as layer thickness.

In embodiments, an insert-holding tab 314B may mechanically attach to an insert 312B. Alternatively, any suitable attachment method may be used. This insert may allow for improved U-factors for windows without the manufacturing challenges associated with penetrating the primary seal, such as a spacer. This may allow for reduced manufacturing costs. An insert-holding tab 314B may help position an insert 312B optimally between a first window pane 302B, a second window pane 310B, and spacers 304B and 306B.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components and individual functions can be distributed among different components. In this regard, any number of the features of the different embodiments described herein may be combined into one single embodiment and alternate embodiments having fewer than or more than all of the features herein described as possible.

While various embodiments have been described for purposes of this disclosure, various changes and modifications may be made which are well within the scope of the disclosed methods. Numerous other changes may be made which will readily suggest themselves to those skilled in the art and which are encompassed in the spirit of the disclosure.

What is claimed:

1. An autonomous electrochromic window comprising:
   a first window pane;
   a second window pane spaced apart from the first window pane;
   a frame holding the first and second window panes;
   a unitary electrochromic insert assembly, wherein the unitary electrochromic insert assembly includes:
   an electrochromic device;
   an energy collection device;
   an energy storage device; and
   a controller controlling operation of the electrochromic device.

2. The autonomous electrochromic window of claim 1 wherein at least one of the electrochromic device, the energy collection device, and the energy storage device is transparent.

3. The autonomous electrochromic window of claim 1 wherein the energy collection device is selected from one or more of a photovoltaic device, a wireless energy receiving device, a magnetic induction device, or a thermoelectric device.

4. The autonomous electrochromic window of claim 1 wherein the unitary electrochromic insert assembly is attached to a surface of at least one of the first and second window panes.

5. The autonomous electrochromic window of claim 1 wherein the unitary electrochromic insert assembly further comprises a transparent rigid substrate, and wherein unitary electrochromic insert assembly is located between the first window pane and the second window pane.

6. The autonomous electrochromic window of claim 5 wherein the location of the unitary insert assembly is selected to optimize the U-value of the window.

7. The autonomous electrochromic window of claim 1 wherein the unitary electrochromic insert assembly, the first window pane, and the second window pane are substantially the same size.

8. The autonomous electrochromic window of claim 1 wherein the electrochromic device can be operated by the controller to change between at least a first opacity state and a second opacity state less transparent than the first opacity state.

9. The autonomous electrochromic window of claim 1 wherein the controller adjusts the transparency of the electrochromic device using energy generated by the energy collection device.

10. The autonomous electrochromic window of claim 1 wherein the controller adjusts the transparency of the electrochromic device using energy generated by the transparent energy collection device and stored in the transparent energy storage device.

11. The autonomous electrochromic window of claim 1 wherein the energy storage device is a capacitor, and further wherein the capacitor reflects some portion of the electromagnetic spectrum, where the some portion of the electromagnetic spectrum is infrared or ultraviolet.

12. An autonomous unitary electrochromic assembly comprising:
    a transparent substrate;
    an electrochromic device having at least a first opacity state and a second opacity state;
    an energy collection device;
    an energy storage device;
    a controller adapted to use energy generated by the energy collection device and stored in the energy storage device to change the electrochromic device from the first opacity state to the second opacity state;
    a first window pane spaced apart from the electrochromic device, wherein the first window pane is substantially parallel to a first-side of the electrochromic device;
    a second window pane spaced apart from the electrochromic device, wherein the second window pane is substantially parallel to a second-side of the electrochromic device; and
    an insert holding tab coupled to the transparent substrate, wherein the insert holding tab is configured to mechanically insert into a window frame;
    wherein the window frame houses the first window pane, the second window pane, the transparent substrate, the electrochromic device, the electrochromic device controller, the energy storage device, and the energy collection device.

13. The autonomous unitary electrochromic assembly of claim 12, wherein the energy collection device is a transparent thin-film photovoltaic device.

14. The autonomous unitary electrochromic assembly of claim 12, wherein the energy storage device is a capacitor.

15. The autonomous unitary electrochromic assembly of claim 14, wherein the capacitor reflects a substantial portion of the infrared spectrum.

16. The autonomous unitary electrochromic assembly of claim 12 wherein the energy collection device is selected from one or more of a wireless energy receiving device, a magnetic induction device, or a thermoelectric device.

17. The autonomous unitary electrochromic assembly of claim 12 wherein the electrochromic device, the energy storage device, and the energy collection device are transparent.

18. An autonomous unitary electrochromic assembly comprising:
    a transparent substrate;
    an electrochromic device having at least a first opacity state and a second opacity state;
    an energy collection device;
    an energy storage device; and
    a controller adapted to use energy generated by the energy collection device and stored in the energy storage device to change the electrochromic device from the first opacity state to the second opacity state;
    wherein the energy storage device is a capacitor, and further wherein the capacitor reflects a substantial portion of the infrared spectrum.

19. An autonomous unitary electrochromic assembly comprising:
    a transparent substrate;
    an electrochromic device having at least a first opacity state and a second opacity state;
    an energy collection device;
    an energy storage device; and
    a controller adapted to use energy generated by the energy collection device and stored in the energy storage device to change the electrochromic device from the first opacity state to the second opacity state;

wherein the electrochromic device, the energy storage device, and the energy collection device are transparent.

* * * * *